(12) United States Patent
Griffiths et al.

(10) Patent No.: US 6,194,689 B1
(45) Date of Patent: *Feb. 27, 2001

(54) RADIANT HEATER ELEMENT FOR USE IN GRILL AND THE LIKE

(75) Inventors: Simon P. Griffiths; Christopher R. Taylor, both of Columbus, MS (US)

(73) Assignee: Emerson Electric Co., St. Louis, MO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/075,960

(22) Filed: May 11, 1998

(51) Int. Cl.[7] .................................................. H05B 3/68
(52) U.S. Cl. ............................................... 219/450.1
(58) Field of Search ....................... 219/450.1, 451.1, 219/460.1, 461.1, 465.1, 466.1; 99/378, 422

(56) References Cited

U.S. PATENT DOCUMENTS

| Re. 34,671 | | 7/1994 | Long . | |
| 1,711,472 | * | 4/1929 | Lewin | 219/450.1 |
| 3,398,264 | * | 8/1968 | Katzman et al. | 219/450.1 |
| 3,866,018 | | 2/1975 | Hurko | 219/452.12 |
| 4,034,206 | * | 7/1977 | Penrod | 219/460.1 |
| 4,321,857 | | 3/1982 | Best . | |
| 4,414,465 | * | 11/1983 | Newton et al. | 219/460.1 |
| 4,471,214 | | 9/1984 | Gossler et al. | 219/461.1 |
| 4,527,538 | | 7/1985 | Caferro . | |
| 4,619,190 | | 10/1986 | Smith . | |
| 4,788,414 | | 11/1988 | Schreder | 219/451.1 |
| 4,862,795 | | 9/1989 | Hawkins . | |
| 5,094,155 | | 3/1992 | Long . | |
| 5,094,221 | | 3/1992 | Ho . | |
| 5,190,027 | | 3/1993 | Miceli . | |
| 5,566,607 | | 10/1996 | Schleimer . | |
| 5,676,049 | | 10/1997 | Arnold . | |

* cited by examiner

*Primary Examiner*—Sang Paik
(74) *Attorney, Agent, or Firm*—Howrey Simon Arnold & White, LLP

(57) ABSTRACT

A grill (100) includes a hot plate (102) on one side of which is a cooking surface (104) upon which food to be cooked is set. A heating unit (106) installed on the underside (108) of the hot plate is used to heat the grill so the cooking surface temperature is a desired temperature. The unit includes a radiant heating element (110) and a pan (114) in which the heating element is installed. A cavity (C) defined by the underside of the grill, a sidewall (118) of the pan, and a top surface (122) of an insulation material (120) in which the heating element is supported, is heated to a uniform temperature across the cavity, and the grill is heated to this temperature. This uniformity of temperature results in food placed anywhere on the grill rapidly heating to a desired temperature and the food being cooked uniformly throughout.

17 Claims, 2 Drawing Sheets

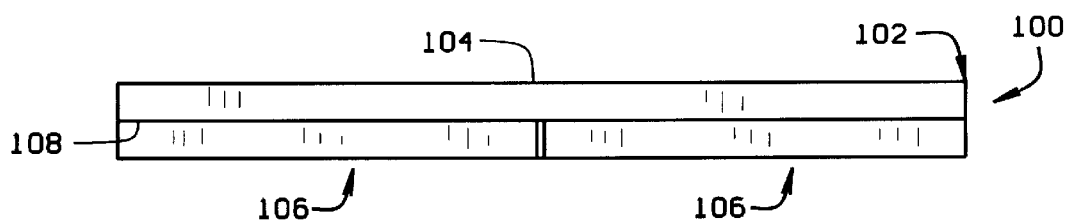
FIG. 5
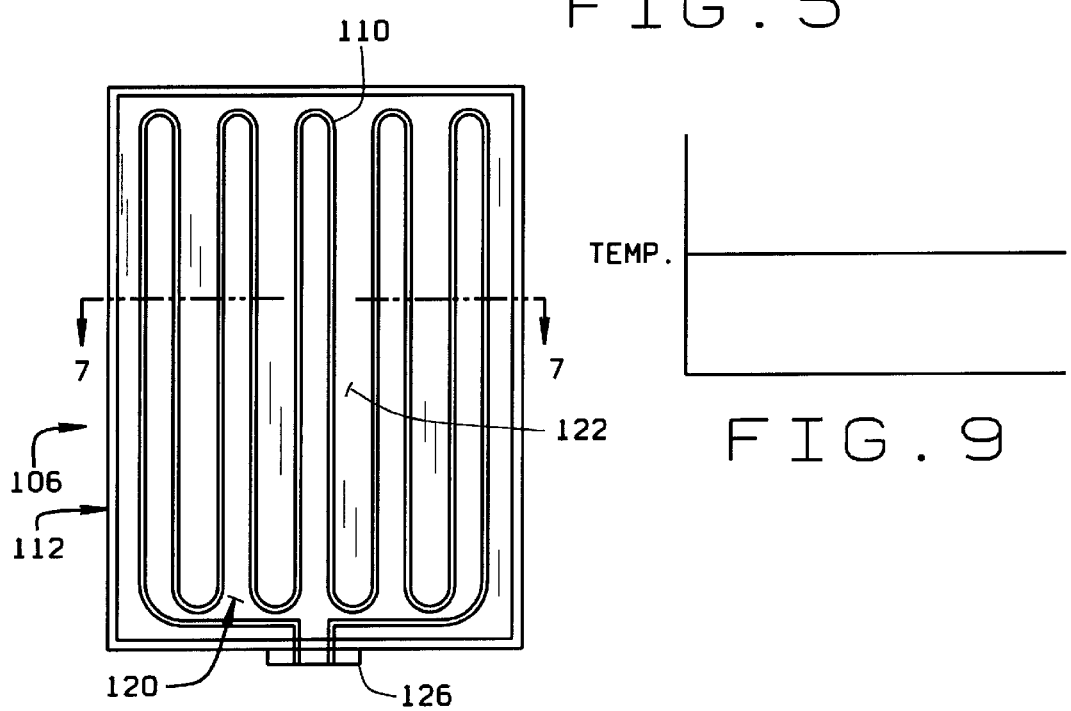
FIG. 6
FIG. 9
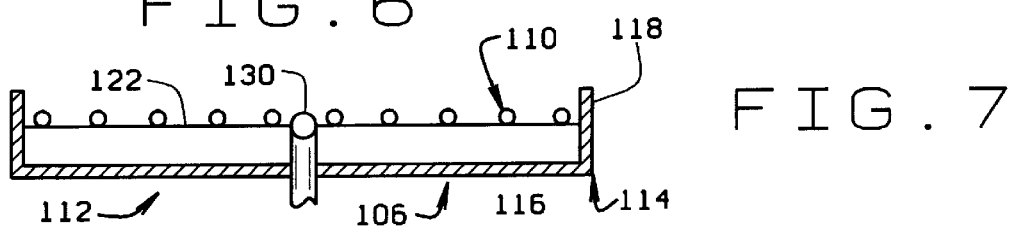
FIG. 7
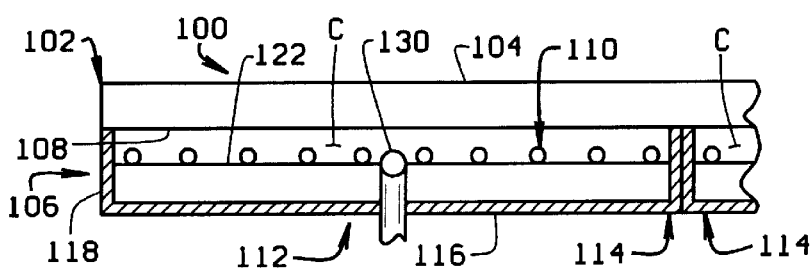
FIG. 8

RADIANT HEATER ELEMENT FOR USE IN GRILL AND THE LIKE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to grills and hot plates used in commercial establishments and domestically, and more particularly, to a new or replacement heating unit for such grills.

Cooking grills used in high volume food outlets generally comprise a top plate on the upper surface of which food is placed to be cooked. As shown in FIG. 1, a tubular heating unit 12 is installed beneath a grill plate 10. In actuality, and as shown in FIG. 2, a series of tubular heating units are installed in a side-by-side configuration on the underside of plate 10. The heating units are mounted between the top plate and a bottom plate 14. A layer 16 of a wool-type insulation material is held in place on the underside of plate 14 by yet a third plate 18. This entire assembly is held together by a plurality of spaced bolts 20 which are sufficiently long so to extend through all of the plates. Fasteners 22 are then used to complete the assembly.

There are a number of problems with this construction. First, is the efficiency of the grill to cook food. For example, in high volume cooking, it is expected that the grill will heat a frozen hamburger patty in approximately 35 seconds from the time the patty is placed on the grill. When the grill is at temperature, this will occur. However, when the grill is first turned on, the grill takes up to eight minutes to react to the heat load represented by the patty. Second, the temperature profile across the heating area of the grill is non-uniform. As shown in FIG. 3 in the area adjacent the location of tubular heating elements there is a hot spot. Between adjacent sections of the heating element, there is a substantial fall off in temperature. As a result, food placed on a portion of the grill over a heating element cooks faster than food placed on other parts of the grill. And, for larger items such as steaks, the food is cooked inconsistently.

In addition to the effects on cooking, if a heating element fails, there is a substantial amount of downtime required in order to replace the failed unit. The grill must be disassembled, the unit replaced, and then the grill reassembled before being used again for cooking. If this can be done during normal maintenance periods, there may be little or no impact on food service. If, however, replacement must be made during normal business hours, service will be greatly impaired.

BRIEF SUMMARY OF THE INVENTION

Among the several objects of the present invention may be noted the provision of grill or hot plate used for cooking food, and in particular, cooking food quickly;

the provision of such a grill having a new heating element used therewith, either as new or replacement equipment, the heating element having demonstrable advantages over conventional heating units used with such grills;

the provision of such a grill employing a radiant heater element and a support base for the element, the radiant heating element extending across the support base so to provide more uniform heating of the portion of the grill beneath which the element is mounted;

the provision of a radiant heating element assembly which brings the hot plate portion of the grill to a desired cooking temperature in substantially less time than a conventional tubular heating element;

the provision of such an assembly in which the hot plate and heating unit together define a cavity in which the heating element is supported, the heating element heating the cavity to uniform temperature so to eliminate hot spots on the grill and produce uniform cooking of food;

the provision of such an assembly requiring fewer parts than is required by a conventional heating element thereby simplifying the design, construction, and cost of an assembly, as well as making it easier to install and replace the assembly; and, the provision of such an assembly which enables frozen hamburger patties and the like to be rapidly cooked to a desired temperature so to cook food quickly and properly.

In accordance with the invention, generally stated, a grill includes a hot plate on one side of which is a cooking surface upon which food to be cooked is set. A heating unit installed on the underside of the hot plate heats the grill so the cooking surface temperature is a desired temperature. The assembly includes a radiant heating element and a base supporting the element. The top plate and heating unit together define a cavity which is heated to a uniform temperature across the cavity and to which the grill is heated. This uniformity of temperature results in food placed anywhere in a heated area on the grill rapidly heating to a desired temperature and the food being cooked uniformly throughout. Other objects and features will be in part apparent and in part pointed out hereinafter.

BRIEF DESCRIPTION OF THE SEVERAL VIEWS OF THE DRAWINGS

In the drawings.

FIG. 5 is a side elevational view of the grill;

FIG. 6 is a top plan view of a heating unit;

FIG. 7 is a sectional view of the unit taken along line 7—7 in FIG. 6;

FIG. 8 illustrates the side-by-side installation of heating units; and,

FIG. 9 is a temperature profile for the cooking surface of a grill with the heating units installed.

Corresponding reference characters indicate corresponding parts throughout the drawings.

DETAILED DESCRIPTION OF THE INVENTION

Figure 1:
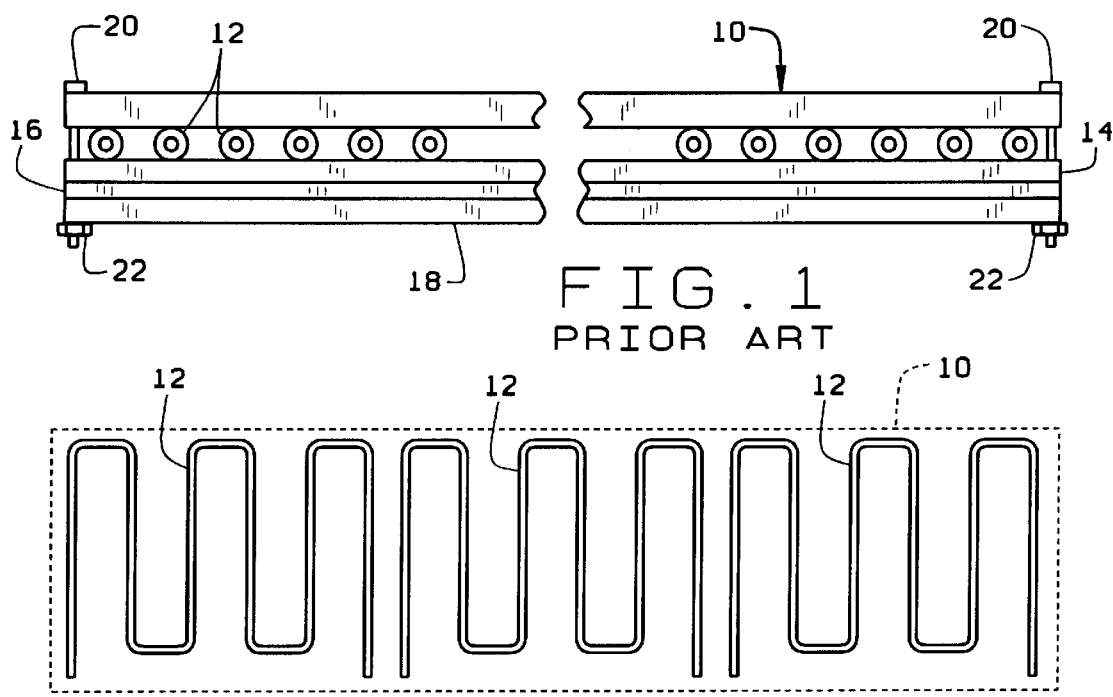
FIG. 1 is a side elevational view of a conventional, prior art grill assembly.
Figure 2:
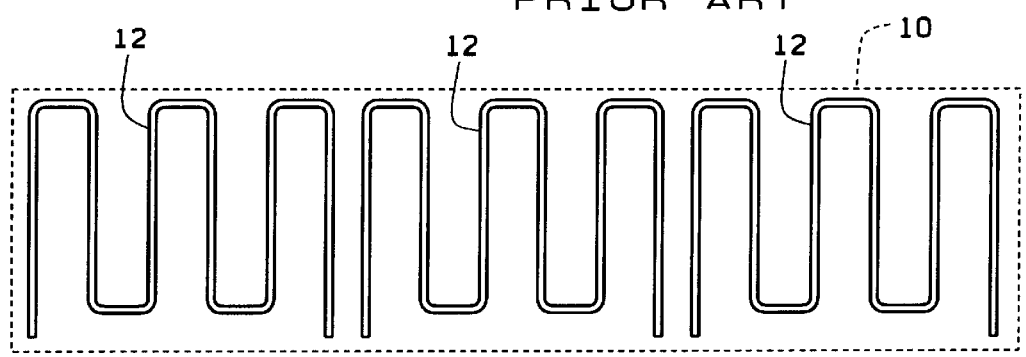
FIG. 2 is a plan view of a prior art tubular heating element assembly used with the grill.
Figure 3:
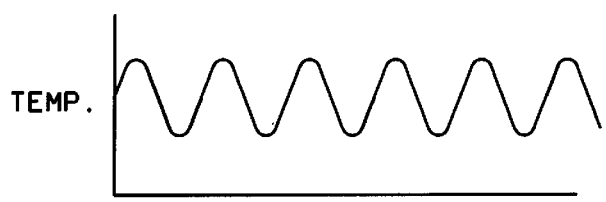
FIG. 3 is a temperature profile for the tubular heating assembly.

Referring to the drawings, a prior art grill construction as shown in FIGS. 1 and 2 has been previously described, as bas the temperature profile for such a grill as shown in FIG. 3. A grill of the present invention is indicated generally 100 in FIG. 4. The grill includes a hot plate 102, the top surface 104 of which is a cooking surface upon which food to be cooked is set. A heating unit 106 installed on the bottom 108 of the hot plate is used to heat the grill so the cooking surface temperature is a desired temperature. The unit includes a radiant heating element 110 and a base 112 on which the heating element is supported. A cavity C is defined by surface 108 of the cooking plate, and base 112 of each heating unit 106.

Figure 4:
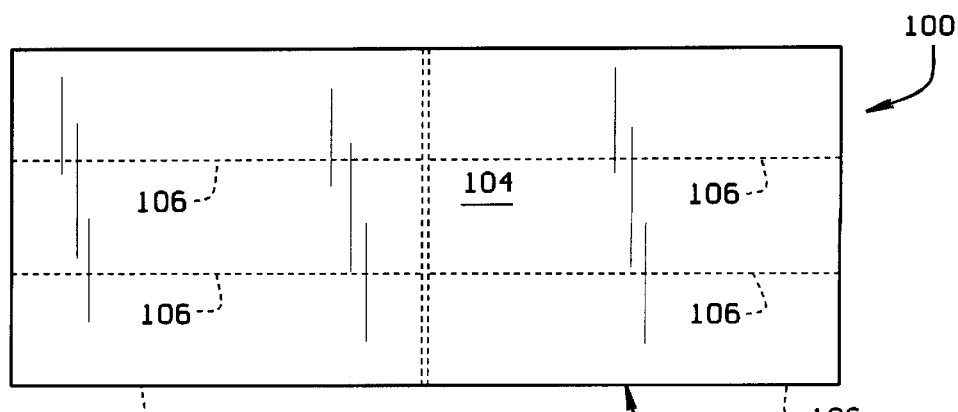
FIG. 4 is a top plan view of a grill employing heating units of the present invention.

In FIG. 4, six heating units 106 are shown Each heating unit is rectangular when viewed in plan. Further, the heating units are arranged in a side-by-side relationship with the longer section of each unit extending lengthwise of the grill. Thus, as shown in the drawings, the six heating units 106 comprise two-three unit installations, one on each side of the grill. Each unit is separately installed so if a unit needs to be replaced, it can be so without having to disconnect or remove any of the other heating units. Further, each heating unit is self-contained. As such, removal and replacement of any heating unit 106 does not require the disassembly and subsequent reassembly of grill 100.

Referring to FIGS. 6–8, each heating unit 106 comprises a pan 114 which, for the grill construction shown in FIG. 4, is rectangular in shape. The pan has a generally flat base 116, and a circumferential sidewall 118. A cake 120 of an insulation material is sized to fit in the pan, and the cake has a top surface 122 on which radiant heating element 110 is supported. The heating element can be a coil or a ribbon type heating element Both types of radiant heating elements are well-known in the art. As shown in FIG. 6, radiant heating element 10 is laid out in a serpentine or sinuous pattern on surface 122 of the insulation material. The pattern shown in FIG. 6 is illustrative only, and the heating element may be laid out in other patterns without departing from the scope of the invention. What is important is that the pattern helps provide a uniform distribution of heat across heating unit 106. The ends of the radiant heating element are terminated in an electrical connector 126 which matingly connects with an electrical connector (not shown) on the underside of hot plate 102 for ease of installation and removal of heating unit 106. A heat sensing element 130 is also installed in the heating unit. Heat sensing element 130 is responsive to the temperature within cavity C exceeding a predetermined temperature to open the electrical circuit through radiant heating element 110 so as not to damage the heating element.

In FIGS. 7 and 8 it is seen that the height of pan sidewall 118 is greater than the thickness of insulation cake 120. Thus, when heating unit 106 is in place beneath hot plate 102, cavity C is formed by the space between the opposed sidewalls of pan 114, and the space between bottom 108 of the hot plate and surface 122 of the insulation material. Because the heating element of the present invention is not in direct contact with the hot plate; but rather, heats cavity C, the heat distribution is uniform across the heating unit. For the number of heating units 106 employed, the temperature to which the respective cavities are heated by the respective heating elements is uniform across the length of the grill. Unlike prior art grill constructions where heat distribution was non-uniform, as shown in FIG. 3, the temperature of cavity C is, as shown in FIG. 9, constant across the cavity. As a result, the underside 108 of the grill plate is uniformly heated to the same temperature. In addition to providing uniform heat distribution, the heating unit of the present invention has been found to heat the hot plate to a desired food cooking temperature substantially quicker than is possible with the prior art units. For example, to heat a grill having a conventional tubular heating system to 350° F. (177° C.) would take approximately eight minutes. A grill equipped with the heating units 106 of the present invention is heated to the same temperature in five minutes (approximately 37% faster).

What has been described is grill usable both domestically, and in commercial food establishments, to quickly and properly cook food placed on the grill. A new heating element for use with the grill comprises a radiant heating element which enables the grill to reach cooking temperatures faster than with conventional elements, and spread heat more uniformly over the cooking surface. The heating element is usable as either as new equipment or as replacement equipment. Multiple heating units are installed beneath the hot plate portion of the grill, and each unit includes a support base defining a cavity heated by the radiant heating element. The heating assembly has a simple construction so the grill requires fewer parts than is required when a conventional heating element is used. This not only reduces costs, but also maintenance time. Use of the radiant heating element allows food such as frozen hamburger patties to be rapidly brought to a desired cooking temperature regardless of where the food is placed on the grill.

In view of the foregoing, it will be seen that the several objects of the invention are achieved and other advantageous results obtained.

As various changes could be made in the above constructions without departing from the scope of the invention, it is intended that all matter contained in the above description or shown in the accompanying drawings shall be interpreted as illustrative and not in a limiting sense.

What is claimed is:

1. A grill for cooking food, comprising:
   a grill surface having a top side comprising a cooking surface; and
   at least one modular heating unit adapted to be modularly installed under a bottom side of said grill surface to heat said grill surface in a region generally above said heating unit, said at least one modular heating unit including a radiant heating element and a base upon which said heating element is supported;
   wherein said at least one modular heating unit further comprises a pan having a bottom and circumferential side walls, said pan bottom being adapted to receive said heating element support base;
   and wherein said circumferential side walls, said pan bottom, and an area of said bottom side of said grill surface cooperate to define a substantially sealed cavity having said radiant heating element disposed at a bottom thereof in a spaced-apart relation with said bottom of said hot plate.

2. The grill of claim 1 wherein the resulting cooking surface temperature is substantially uniform in said region generally above said at least one heating unit.

3. The grill of claim 2 where said at least one modular heating unit comprises a plurality of modular heating units sufficient to occupy substantially all of said bottom of said hot plate, said modular heating units being modularly installed adjacent to each other such that the cooking surface temperature is substantially uniform across substantially all of said cooking surface.

4. The grill of claim 1 wherein said at least one modular heating unit comprises a plurality of modular heating units, and wherein each of said plurality of modular heating units is separately removable so as to allow replacement thereof without requiring removal of others of said plurality of modular heating units.

5. The grill of claim 1, wherein said radiant heating element is arranged in a predetermined pattern within said heating unit.

6. The grill of claim 1 further including a controller for controlling the temperature of said heating element and for disrupting application of power to said heating element if the temperature of said cavity exceeds a predetermined temperature.

7. The grill of claim 1 wherein each heating element is an open coil heating element.

8. The grill of claim 1 wherein each heating element is a ribbon heating element.

9. A grill in accordance with claim 1, wherein said grill comprises at least six modular heating units, each cooperating with an underside region of said hot plate to define a separate, substantially sealed cavity.

10. The grill of claim wherein said heating element support base comprises a cake of insulation material sized to fit in said pan and having a surface upon which said heating element is supported, the height of said cake of insulation material being less than the height of said circumferential sidewalls of said pan so as to maintain said spaced-apart relation between said heating element and said bottom side of said hot plate.

11. A method of heating a region of a grill hot plate, comprising modularly installing a first modular heating unit beneath said region of said hot plate, such that a substantial seal is established between a pan defining a bottom and circumferential sides of said first modular heating unit and an underside of said hot plate, and defining a cavity generally beneath said region of said hot plate.

12. A method in accordance with claim 11, further comprising applying power to a radiant heating element disposed in said cavity.

13. A method in accordance with claim 12, further comprising sensing temperature within said cavity.

14. A method in accordance with claim 13, further comprising interrupting said application of power to said radiant heating element in response to detection of temperature in said cavity exceeding a predetermined level.

15. A method in accordance with claim 11, further comprising modularly installing at least a second modular heating unit beneath said hot plate adjacent to said first modular heating unit, thereby enlarging said heated region.

16. A modular heating unit adapted for modular installation beneath a grill surface of a grill for cooking food to heat an area of said grill surface generally above said heating unit, comprising:

a radiant heating element supported upon a base;

a pan having a bottom and circumferential side walls, said pan bottom being adapted to receive said heating element and said base;

wherein said circumferential side walls, said pan bottom, and an area of said bottom side of said grill surface cooperate to define a substantially sealed cavity having said radiant heating element disposed at a bottom thereof in a spaced-apart relation with said bottom of said hot plate.

17. A modular heating unit in accordance with claim 16, further comprising a temperature sensor disposed within said cavity.

* * * * *

UNITED STATES PATENT AND TRADEMARK OFFICE
CERTIFICATE OF CORRECTION

PATENT NO.    : 6,194,689 B1
DATED         : February 27, 2001
INVENTOR(S)   : Simon P. Griffiths and Christopher R. Taylor It is certified that error appears in the above-identified patent and that said Letters Patent is hereby corrected as shown below:

<u>Title page,</u>
Item [54], delete the word "GRILL" and insert the word -- GRILLS --

Signed and Sealed this

Twenty-ninth Day of October, 2002

Attest:

Attesting Officer

JAMES E. ROGAN
*Director of the United States Patent and Trademark Office*